United States Patent [19]

Diepers et al.

[11] 3,890,700

[45] June 24, 1975

[54] METHOD FOR THE MANUFACTURE OF A COMPOSITE WIRE WITH AN ALUMINUM CORE AND NIOBIUM CLADDING

[75] Inventors: Heinrich Diepers, Erlangen-Bruck; Horst Müsebeck, Erlangen; Eduard Wirkner, Furth, all of Germany

[73] Assignee: Siemens Aktiengesellschaft, Munich, Germany

[22] Filed: July 12, 1973

[21] Appl. No.: 378,423

[30] Foreign Application Priority Data

Aug. 3, 1972 Germany ........................... 2238293

[52] U.S. Cl. ............... 29/599; 29/624; 29/DIG. 11; 72/47; 174/126 CP

[51] Int. Cl. ............................................ H01v 11/14

[58] Field of Search ............... 29/599, DIG. 11, 624; 72/47; 174/126 CP, DIG. 6

[56] References Cited

UNITED STATES PATENTS

| | | | |
|---|---|---|---|
| 3,218,693 | 11/1965 | Allen et al. | 29/599 |
| 3,465,429 | 9/1969 | Barber et al. | 29/599 |
| 3,514,850 | 6/1970 | Barber et al. | 29/599 |
| 3,614,301 | 10/1971 | Royet | 174/126 CP |
| 3,623,221 | 11/1971 | Morton et al. | 29/599 |
| 3,641,665 | 2/1972 | Matricon | 29/599 |
| 3,644,987 | 2/1972 | Scheffler et al. | 29/599 |
| 3,648,356 | 3/1972 | Ziemek | 29/474.1 |
| 3,665,595 | 5/1972 | Tanaka et al. | 29/599 |
| 3,728,165 | 4/1973 | Howlett | 29/599 X |

OTHER PUBLICATIONS

C. Graeme–Barber et al., "Tubular Niobium/Copper Conductors for AC Superconductive Power Transmission," Cryogenics, Vol. 12, No. 4, August 1972, pp. 317 & 318.

*Primary Examiner*—C. W. Lanham
*Assistant Examiner*—D. C. Reiley, III
*Attorney, Agent, or Firm*—Kenyon & Kenyon Reilly Carr & Chapin

[57] ABSTRACT

A method for manufacturing a composite wire having an aluminum core and niobium cladding surrounding the core in which a starting structure comprising a rod-shaped aluminum core and a niobium jacket enclosing the core is assembled with a drawing aid surrounding the niobium jacket and then reduced in cross section by repetitive cold-drawing until a solid bond between the niobium and the aluminum is obtained. After removing the drawing aid, the composite structure so formed is then subjected to a surface-smoothing cold-forming process.

11 Claims, 4 Drawing Figures

METHOD FOR THE MANUFACTURE OF A COMPOSITE WIRE WITH AN ALUMINUM CORE AND NIOBIUM CLADDING

BACKGROUND OF THE INVENTION

The invention relates to the manufacture of a composite wire having an aluminum core with a niobium cladding surrounding the core in general and more particularly to an improved method of making such a wire.

As is well known, niobium is highly suited as a superconductor material for use in superconducting cables, such as a-c superconducting cables. In this connection it can advantageously be used in the form of a thin layer which is deposited onto a carrier which provides for electrical stabilization. Such a carrier may for example be tubular shaped metal which has high normal electric conductivity at the operating temperature of the cable of, i.e., about 4.2 K, and is thermally highly conductive, e.g., copper or aluminum. Aluminum in very pure form is particularly well suited since it is lighter than copper and is thought to have particularly low resistivity at low temperatures. The applicability of such a composite wire for use in superconducting cables has been recognized, see, for example, German Offenlegungsschrift 1,814, 036, and Bulletin of the Schweizerischer Elektrotechnischer Verein (Swiss Society of Electrical Engineers) Vo. 61 (1970), pp. 1179 to 1190.

The manufacture of such wires should be able to be done in a simple manner and should permit production of long length while also producing good superconductivity properties. In particular, a-c losses must be kept as low as possible. The manufacture of cables of this nature having all these properties is considerably difficult.

Thus, it is an object of the invention to make possible the simplest possible manufacture of a composite wire with an aluminum core and niobium cladding surrounding the core while achieving at the same time good superconductivity properties.

SUMMARY OF THE INVENTION

According to the present invention, this problem is solved by starting with a structure comprising a rod-shaped aluminum core and a niobium jacket enclosing the core. The starting structure is reduced, with a drawing aid surrounding the niobium jacket, in cross section by cold-drawing repetitively until a solid bond between the niobium and the aluminum is obtained. After removing the drawing aid, the composite structure so formed is subjected, in a final step, to a surface-smoothing cold-forming process.

The method according to the invention has a number of advantages which are of great importance in the manufacture of a wire suitable for a superconducting a-c cable. First, an intimate mechanical bond between the niobium cladding and the aluminum core is ensured by the cold-drawing. The electric contact resistance between the niobium and the aluminum is therefore very low. This is of particular importance for good electrical stabilization of the niobium cladding by the aluminum core. As aluminum has a larger coefficient of thermal expansion than niobium, the solid bond between the niobium and the aluminum is also important to insure that the niobium cladding does not peel from the aluminum core when cooled from room temperature to the operating temperature of the cable, e.g. about 4.2K. Furthermore, a smooth niobium surface is obtained during the final fabrication step. As a consequence, the a-c losses of the niobium are very low. These a-c losses depend, particularly when operating the cable such that the lower critical magnetic field $H_{C1}$ of the niobium is not exceeded, mainly on the surface properties of the niobium.

The method according to the invention becomes particularly simple if a round aluminum rod, preferably of high-purity aluminum, is pushed into a niobium tube of appropriate inside diameter to obtain the starting structure. The niobium tube may be seamless or may, for example, be electron-beam-welded.

An extremely smooth surface of the niobium cladding is obtained if the composite structure is round-swaged as the last fabrication step. At the same time, this densifies the niobium jacket. This leads to a high critical current density for the niobium cladding, which is of particular importance if, during the operation of the cable, the lower critical magnetic field $H_{C1}$ is exceeded. Moreover, the bond between the niobium and the aluminum is further enhanced by the swaging. For even further smoothing of the niobium surface, it has been found advantageous to rotate the composite structure during the round-swaging about its longitudinal axis relative to the swaging jaws.

The number of times which the starting structure must be cold-drawn to obtain a firm bond between the niobium and the aluminum can readily be determined in each case by experimentation. A sufficiently solid bond exists if, during cross section-reducing fabrication, particularly during the swaging, aluminum is no longer squeezed out of the niobium tube at its ends. Alternatively, a good bond may be assured by repetitive cold-drawing until the final cross section measured over the niobium cladding is reduced by about 20%. In principle, this reduction of the cross section can be obtained in a single drawing step. However, for a more careful treatment of the niobium surface, the use of several drawing steps is preferable.

The composite structure, incidentally, need not be subjected to the final fabrication step immediately after reaching a solid bond between the niobium and the aluminum. The composite structure can instead be subjected first to further cross section-reducing sold-working steps, particularly cold-drawing steps, and then be round-swaged after the last cold drawing step. The composite structure can thus be brought to a desired cross section relatively quickly and simply prior to the final round-swaging.

A metal jacket can advantageously be used as a drawing aid. For example, a copper tube, which encloses the niobium cladding may be used. In order to attain a niobium surface which is initially quite smooth, a tube of unannealed copper may be advantagesouly used. The copper tube can be left on the niobium cladding during all the cold-drawing steps and then chemically dissolved prior to the last, surface-smoothing fabrication step. If drawing oil is also applied to its surface, such copper tubing will meet the ruggedness requirements for cold-drawing, as is common in the cold-drawing of copper wire.

A layer of lubricating varnish preferably of cellulose (Zapon) varnish or other fast-drying nitrocellulose lacquers, which is applied to the niobium cladding is also suitable as a drawing aid. However, such a layer of varnish should preferably be used only for the manufacture of shorter wires. If used in drawing long wires, attention must be given to adequate cooling of the drawing dies, so that the varnish does not soften.

A layer of niobium pentoxide, which is formed at the surface of the niobium cladding by anodic oxidation is also suitable as a drawing aid. However, in contrast to the copper tube, the varnish layer and the layer of niobium pentoxide must be renewed after a few drawing steps. If used, these layers are dissolved prior to the final, surface-smoothing fabrication step.

In order to incorporate as few impurities into the composite wire as possible, it is further recommended that the surfaces of the components of the starting structure be etched prior to its assembly.

DETAILED DESCRIPTION OF THE PREFERRED EMBODIMENT

The invention will be further explained with reference to the following examples.

EXAMPLE 1

Figure 1:
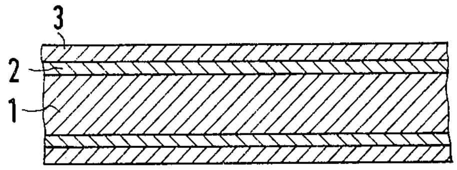
FIG. 1 shows schematically, in longitudinal cross section, a starting structure covered with a drawing aid for use in the method according to the invention.

For assembling the starting structure, a round rod 1 of aluminum with a purity of 99.999% by weight was pushed into a niobium tube 2, as shown on FIG. 1. The aluminum rod 1 was 500 mm long and had a diameter of 11.0 mm. The niobium tube 2 was also 500 mm long and had an inside diameter of 11.4 mm and a wall thickness of 0.8 mm. Before the starting structure was assembled, the niobium tube 2 and the aluminum rod 1 were pickled to purify the surfaces. A mixture of 50% by volume nitric acid and 50% by volume fluoric acid was used as the pickling solution for the niobium tube. The aluminum rod was etched with hydrochloric acid.

As a drawing aid, an unannealed copper tube 3 with an inside diameter of 13.5 mm and a wall thickness of about 1 mm was pushed over the niobium tube 2, after it was first pickled in diluted nitric acid for cleaning.

Figure 2:
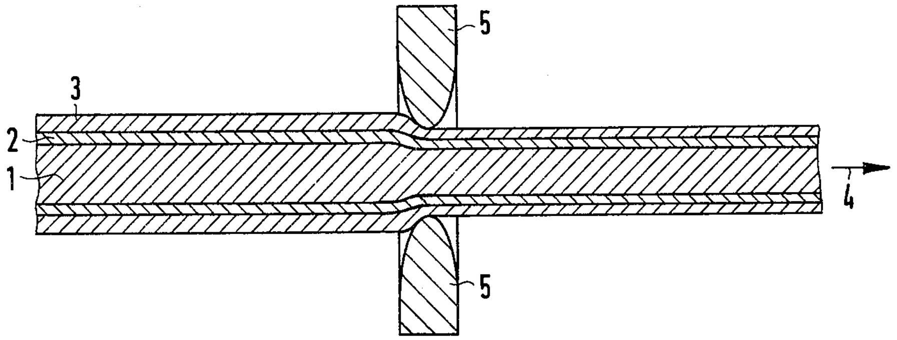
FIG. 2 shows schematically the manufacture of a composite structure by cold-drawing of the starting structure.

The starting structure enclosed by the copper tube 3 was then cold drawn repetitively until an outside diameter of the niobium cladding of about 2.3 mm was reached. The reduction in the cross section in each drawing step was about 10%. Such a drawing step is illustrated by FIG. 2. The drawing velocity, at which the starting structure was drawn in the direction of the arrow 4 through the drawing die 5 was, for instance 14 m/min in the first drawing steps and was subsequently increased to, for instance, 20 m/min. To further facilitate the drawing, commercial drawing oil was applied to the copper tube 3. After the first two or three drawing steps, a solid bond between the niobium and the aluminum was established.

Figure 3:
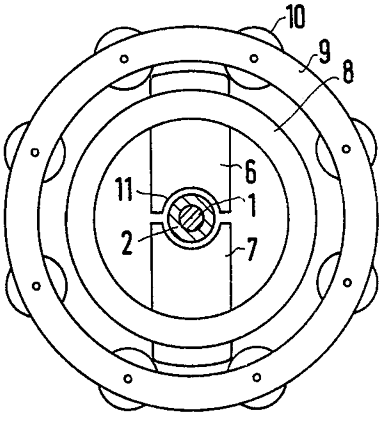
FIG. 3 shows schematically the round-swaging of a composite structure by means of a round-swaging machine.
Figure 4:
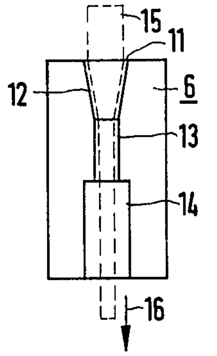
FIG. 4 shows schematically the underside of a swaging jaw of the round-swaging machine.

After the last drawing step, the copper jacket 3 was dissolved from the composite structure consisting of the aluminum core 1 and the niobium cladding 2 by means of nitric acid. Subsequently the composite structure was round-swaged in a round-swaging machine as a final fabrication step, as shown schematically in FIG. 3. The design of the swaging mechanism of the round-swaging machine shown in FIG. 3 comprises two swaging jaws 6 and 7, which are resiliently supported in a ring-shaped mounting 8. The ring-shaped mounting 8 rotates along with the swaging jaws 6 and 7 within a ring-shaped mounting 9, in which a number of rollers 10 are supported which also rotates, but with half the speed of rotation. As the swaging jaws 6 and 7 pass the rollers 10, they are pushed inward in the ring-shaped mounting 8 to strike the surface of the niobium cladding 2 of the composite structure. The surfaces of the swaging jaws 6 and 7 hitting the niobium cladding of the composite structure each have a slot 11 with approximately semicircular cross section. As may be seen from the plan view of FIG. 4, the slot 11 is first tapered in a first part 12 to the desired final dimension of the composite wire and then remains approximately constant in a second part 13. This second part 13 may further be followed by a third part 14 with an again enlarged slot cross section. The composite structure 15, which is indicated in FIG. 4 with dashed lines, was advanced during the swaging between the swaging jaws in the direction of the arrow 16 at a feeding velocity of 2 m/min, for example. In the process, it was swaged down from the outside diameter measured after the last drawing step to a diameter of about 2 mm. The swaging jaws strike the composite structure 4550 times per minute, the ring-shaped mounting 8 rotating about the composite structure at several hundred revolutions per minute. The composite structure was turned at about 15 r.p.m. Thereby it is insured that the composite structure changes its position relative to the swaging jaws continuously and thus will become very well rounded and smoothed. Because of the slow, simultaneous rotation of the wire the rapidly rotating swaging jaws are unable to leave marks on the surface of the composite structure when they strike it. The surface of the niobium cladding 2, which after the last cold-drawing step and dissolution of the copper jacket 3 was still somewhat wavy, was made completely smooth by the round-swaging.

The a-c losses in the niobium layer, the contact resistance between the niobium and the aluminum and the residual resistance ratio of the aluminum, i.e., the quotient of the ohmic resistance of the aluminum at 300 K and the ohmic resistance of the aluminum at 4.2 K were measured in the finished composite wire. Prior to its fabrication into the composite wire, the aluminum rod 1 had a residual resistance ratio of about 2500. In the finished composite wire, the residual resistance ratio of the aluminum was surprisingly reduced to a still very high value of about 1200. Such a redisual resistance ratio is fully adequate for the use of the composite wire in a superconducting cable. An annealing treatment of the composite wire to increase the residual resistance ratio is therefore not necessary. In addition to saving an annealing treatment, the present method has the further advantage that the undesirable formation of a very brittle intermetallic phase of $NbAl_3$ at the contact zone between the niobium and the aluminum is prevented. In the various cold-forming steps of the method according to the invention, such an intermediate layer, which can develop at higher temperatures, does not occur. Without using an annealing treatment in the strict sense (i.e., at higher temperatures) the residual resistance ratio of the aluminum can surprisingly be increased to a value of about 2000 in a low temperature process by briefly heating the composite wire for about 5 to 30 minutes to about 50°to 100°C, preferably in the stream of a hot-air blower.

The contact resistance between the niobium and the aluminum was very low, i.e., about $3 \times 10^{-8}$ ohms.cm. This low resistance value also shows how thorough the mechanical bond between the niobium and the aluminum is. The a-c losses of the niobium cladding are, as long as the lower critical magnetic field $H_{c1}$ of the niobium of about $10^5$ A/m is not exceeded, pure surface losses and are also very low. At an a-c frequency of 50 Hz they were between about 0.1 and 1 microwatt per $cm^2$ of wire surface.

In the example above, the cross section of the composite body was reduced by about 10% in each cold-drawing step. The percent of reduction of the cross section during each cold-drawing operation can be varied from this value within relatively wide limits, e.g. between about 1 and 30%, so that proper selection may be made, on the one hand, not too many drawing steps are required and, on the other hand, the material is not stressed unnecessarily. The reduction of the cross section during each cold-drawing step should, however, be between about 5 and 15%. The drawing velocity, however, can be increased to higher values than those described above by thorough cooling of the drawing dies. In the round-swaging step, the feed velocity and the speed of rotation of the composite wire depend on the particular properties of the round-swaging machine, particularly on the number of blows per minute. A higher number of blows also permits higher feed velocity.

For etching the niobium and aluminum surfaces, other pickling solutions than those described in the example above can also be used. For etching the niobium, for example, solutions of 2 parts by volume of nitric acid, 2 parts by volume of fluoric acid and 5 parts by volume of sulfuric acid, or of 45 parts by volume of nitric acid, 10 parts by volume of fluoric acid and 45 parts by volume of glycerine are also suitable. For etching the aluminum in addition to hydrochloric acid, a solution of 1 part by volume of fluoric acid, 1.5 parts by volume of hydrochloric acid, 2.5 parts by volume of nitric acid and 95 parts by volume of water of hot 10% sodium hydroxide solution may be used.

EXAMPLE 2

For the preparation of a very long composite wire, a starting structure consisting of an aluminum rod with a diameter of about 20 mm and a length of about 2.5 m and a niobium tube of the same length and an inside diameter of about 21 mm and a wall thickness of about 1.5 mm was made. As the drawing aid, a copper tube with an inside diameter of about 25 mm and a wall thickness of about 1.5 mm was pushed over the niobium tube. The starting structure thus prepared was drawn down in several cold-drawing steps to an outside diameter of the niobium cladding of about 2.25 mm. The diameter of the compound structure thus made was reduced, after the copper layer was removed, to about 2 mm by round-swaging. In the manufacture of the starting structure, in the cold-drawing and in round-swaging, the procedure was otherwise exactly as explained in Example 1. The finished composite wire has a length of over 250 m, and the thickness of the niobium cladding was about 0.1 mm. The electrical properties of the composite wire corresponded to those of the wire according to Example 1.

EXAMPLE 3

Onto a starting structure made according to Example 1 a Zapon lacquer coating was applied as a drawing aid, instead of a covering of copper, by drawing the starting structure through a bath of Zapon lacquer. To dry the lacquer coat faster, a cold-air blower was used. The starting structure provided with the lacquer coating was then further processed as per Example 1. After about two drawing steps the lacquer coating was dissolved with acetone and a new layer of lacquer was applied. This varnish layer was dissolved before the final round-swaging. If drawing oil is used in addition, the number of cold-drawing steps, after which the lacquer layer must be renewed, will be increased to about four.

EXAMPLE 4

The starting structure, which was made according to Example 1, was provided with a lubricating layer of niobium pentoxide of about 0.25 $\mu m$ thickness as a drawing aid, in place of the copper jacket. This layer was produced by anodic oxidation of the surface of the niobium jacket, for instance, in a 25–% ammonia solution. Otherwise, the fabrication followed the procedure of Example 1. After about two or three cold-drawing steps, the niobium pentoxide layer was dissolved in fluoric acid and the niobium surface was subsequently oxidized again. Drawing oil can also be used as an additional drawing aid. The niobium pentoxide layer was dissolved prior to the final round-swaging.

The method according to the invention is not limited to the measures described in detail in the Examples. For example, in the preparation of the starting structure, the niobium tube, after the aluminum rod is inserted into it, can be closed off at its ends, for example, by welding or with screws. Furthermore, the round-swaging, which constitutes the last treatment step, can also be perfomed in several steps, between which the niobium surface can optionally also be cleaned chemically. However, chemical etching of the niobium surface of the wire alone without round-swaging does not lead to satisfactory results, since the drawing marks remaining on the niobium surface after the drawing can be removed by chemical means only partially without removing larger amounts of material, which removal is undesirable in the interest of good utilization of the material. As soon as a solid bond between the niobium and the aluminum is reached, the composite structure can also be round-swaged for an intermediate smoothing of its surface between two cold-drawing steps in the repetitive cold-drawing of the composite structure. Since the drawing aid must be removed prior to the swaging each time, such a measure will not be taken if a copper tube is used as the drawing aid.

Thus an improved method of manufacturing a niobium clad composite wire has been shown. Although specific examples have been given it will be obvious to those skilled in the art that various modifications may be made without departing from the spirit of the invention which is intended to be limited solely by the appended claims.

What is claimed is:

1. A low temperature method for manufacturing a composite wire having an aluminum core clad with niobium without subjecting the composite wire to any temperature above about 100°C., said method comprising the steps of a. forming an aluminum rod;
b. covering said rod with a niobium jacket to form a starting structure;
c. applying a drawing aid to the outside of said jacket;
d. repetitively cold-drawing the starting structure until a intimate mechanical bond between the aluminum and niobium is achieved;
e. removing said drawing aid from said jacket; and
f. subjecting the resulting structure to a surface-smoothing cold-forming process.

2. The method according to claim 1 wherein the starting structure is formed by pushing a round aluminum rod into a niobium tube with a matching inside diameter.

3. The method according to claim 2, wherein said smoothing cold forming process comprises round-swaging.

4. The method according to claim 3, wherein the composite structure is rotated about its longitudinal axis relative to the swaging jaws during the round swaging.

5. The method according to claim 3 wherein the composite structure, after the intimate mechanical bond between the niobium and the aluminum is established, is subjected to further cold-working steps before said round swaging.

6. The method according to claim 1, wherein the starting structure is cold-drawn down to a reduction of the starting cross section, as measured over the niobium jacket, of at least 20%.

7. The method according to claim 1 wherein a copper tube surrounding the niobium jacket is used as a drawing aid.

8. The method according to claim 1 wherein a lubricating varnish layer of quick-drying nitrocellulose varnish is applied to the niobium jacket as a drawing aid.

9. The method according to claim 1 wherein a niobium pentoxide layer is formed on the surface of the niobium jacket as a drawing aid.

10. The method according to claim 1 wherein the surfaces of the components of the starting structure are etched before assembly.

11. The method according to claim 1 and further including the step of briefly heating the composite wire to a temperature in the range of 50°to 100°C after round swaging.

* * * * *